US012746571B2

(12) United States Patent
Hersam et al.

(10) Patent No.: US 12,746,571 B2
(45) Date of Patent: Sep. 29, 2026

(54) ADDITIVE MANUFACTURING OF LARGE-AREA COVALENT ORGANIC FRAMEWORK THIN FILMS

(71) Applicant: NORTHWESTERN UNIVERSITY, Evanston, IL (US)

(72) Inventors: Mark C. Hersam, Wilmette, IL (US); William R. Dichtel, Wilmette, IL (US); Nathan P. Bradshaw, Chicago, IL (US); Austin M. Evans, Evanston, IL (US)

(73) Assignee: Northwestern University, Evanston, IL (US)

( * ) Notice: Subject to any disclaimer, the term of this patent is extended or adjusted under 35 U.S.C. 154(b) by 111 days.

(21) Appl. No.: 18/001,580

(22) PCT Filed: Jun. 14, 2021

(86) PCT No.: PCT/US2021/070703

§ 371 (c)(1),
(2) Date: Dec. 12, 2022

(87) PCT Pub. No.: WO2022/147374

PCT Pub. Date: Jul. 7, 2022

(65) Prior Publication Data

US 2023/0241642 A1 Aug. 3, 2023

Related U.S. Application Data

(60) Provisional application No. 63/038,283, filed on Jun. 12, 2020.

(51) Int. Cl.
*B05D 1/26* (2006.01)
*B05C 5/02* (2006.01)
(Continued)

(52) U.S. Cl.
CPC .............. *B05D 1/26* (2013.01); *B05C 5/0295* (2013.01); *B05C 11/11* (2013.01); *B05D 1/32* (2013.01); *B05D 3/0218* (2013.01)

(58) Field of Classification Search
None
See application file for complete search history.

(56) References Cited

U.S. PATENT DOCUMENTS 6,709,705 B2 * 3/2004 Decre .................. H10K 71/135 257/E21.582
2003/0067528 A1 * 4/2003 Chowdry .................. B41J 2/04 347/103

(Continued)

FOREIGN PATENT DOCUMENTS

CN 203871350 U 10/2014
CN 110698710 A * 1/2020

(Continued)

OTHER PUBLICATIONS

Smith. "Colloid Covalent Organic Frameworks" 58-65. ACS Central Science. Jan. 12, 2017; vol. 3; pp. 58-65; DOI: 10.1021/acscentsci.6b00331 (Year: 2017).*

(Continued)

*Primary Examiner* — Jose I Hernandez-Kenney
(74) *Attorney, Agent, or Firm* — Quarles & Brady LLP

(57) ABSTRACT

Systems and methods for preparing covalent organic framework (COF) thin films is disclosed herein. The systems and method utilize COF colloidal inks, having a diameter of 10-1000 nm, expelled through a nozzle onto a substrate to prepare the COF thin film. The plurality of COF colloidal ink droplets have an effective deposition diameter from the nozzle onto a masked or unmasked substrate, where the substrate may be heated to an effective COF deposition temperature.

16 Claims, 7 Drawing Sheets

(51) Int. Cl.
*B05C 11/11* (2006.01)
*B05D 1/32* (2006.01)
*B05D 3/02* (2006.01)

(56) References Cited

U.S. PATENT DOCUMENTS

| | | | | |
|---|---|---|---|---|
| 2006/0125363 | A1* | 6/2006 | Tahira | H05B 33/10 313/29 |
| 2007/0199824 | A1* | 8/2007 | Hoerr | C25D 17/007 205/80 |
| 2010/0143693 | A1 | 6/2010 | Yaghi et al. | |
| 2013/0183447 | A1* | 7/2013 | Heuft | H10K 71/135 427/256 |
| 2014/0037944 | A1 | 2/2014 | Dichtel et al. | |
| 2016/0237567 | A1 | 8/2016 | Sieber et al. | |
| 2016/0253588 | A1* | 9/2016 | Bondavalli | G06N 3/06 706/27 |
| 2018/0190959 | A1* | 7/2018 | Alkordi | H01M 50/411 |

FOREIGN PATENT DOCUMENTS

| | | | | |
|---|---|---|---|---|
| EP | 2832767 A1 | * 2/2015 | | C08G 12/08 |
| JP | 2004314619 A | * 11/2004 | | |

OTHER PUBLICATIONS

A. K. Mandal, J. Mahmood, J. B. J. C. Baek. Two-dimensional covalent organic frameworks for optoelectronics and energy storage. Chem. Nano. Mat. 2017, 3, 373.

A. K. Mohammed, S. Usgaonkar, F. Kanheerampockil, S. Karak, A. Halder, M. Tharkar, M. Addicoat, T.G. Ajithkumar, R. Banerjee. Connecting Microscopic Structures, Mesoscale Assemblies, and Macroscopic Architectures in 3D-Printed Hierarchical Porous Covalent Organic Framework Foams. J. Am. Chem. Soc. 2020, 142, 8252.

A. M. Evans, I. Castano, A. Brumberg, L. R. Parent, A. R. Corcos, R. L. Li, N. C. Flanders, D. J. Gosztola, N. C. Gianneschi, R. D. Schaller, W. R. Dichtel. Emissive Single-Crystalline Boroxine-Linked Colloidal Covalent Organic Frameworks. J. Am. Chem. Soc. 2019, 141, 19728.

A. M. Evans, M. R. Ryder, N. C. Flanders, E. Vitaku, L. X. Chen, W. R. Dichtel. Buckling of two-dimensional covalent organic frameworks under thermal stress. Ind. Eng. Chem. Res. 2019, 58, 9883.

A. P. Cote, A. I. Benin, N. W. Ockwig, M. O'Keeffe, A. J. Matzger, O. M. Yaghi. Porous, crystalline, covalent organic frameworks. Science 2005, 310, 1166.

A. P. Ruigomez, D. Rodriguez-San-Miguel, K. C. Stylianou, M. Cavallini, D. Gentili, F. Liscio, S. Militia, O. M. Roscioni, M. L. Ruiz-Gonzalez, C. Carbonell, D. Maspoch, R. Mas-Bálleste, J. L. Segura, F. Zamora. Direct On-Surface Patterning of a Crystalline Laminar Covalent Organic Framework Synthesized at Room Temperature. Chem. Eur. 2015, 21, 10666.

A. Pacquit, K. T. Lau, H. McLaughlin, J. Frisby, B. Quilty, D. Diamond. Development of a volatile amine sensor for the monitoring of fish spoilage. Talanta 2006, 69, 515.

A. R. Corcos, G. A. Levato, Z. Jiang, A. M. Evans, A. G. Livingston, B. J. Marinas, W. R. Dichtel. Reducing the Pore Size of Covalent Organic Frameworks in Thin-Film Composite Membranes Enhances Solute Rejection. ACS Mater. Lett. 2019, 1, 440.

A.M. Evans; et al., Seeded Growth of Single-Crystal Two-Dimensional Covalent Organic Frameworks. Science 2018, 361, 52-57.

B. J. Smith, L. R. Parent, A. C. Overholts, P. A. Beaucage, R. P. Bisbey, A. D. Chavez, N. Hwang, C. Park, A. M. Evans, N. C. Gianneschi, W. R. Dichtel. Colloidal covalent organic frameworks. ACS Cent. Sci. 2017, 3, 58.

C. R. DeBlase, K. E. Silberstein, T.-T. Truong, H. c. D. Abruna, W. R. Dichtel. β-Ketoenamine-linked covalent organic frameworks capable of pseudocapacitive energy storage. J. Am. Chem. Soc. 2013, 135, 16821.

D. Rodríguez-San-Miguel, F. Zamora. Processing of covalent organic frameworks: an ingredient for a material to succeed Chem. Soc. Rev. 2019, 48, 4375.

E. B. Secor, T. Z. Gao, A. E. Islam, R. Rao, S. G. Wallace, J. Zhu, K. W. Putz, B. Maruyama, M. C. Hersam. Enhanced conductivity, adhesion, and environmental stability of printed graphene inks with nitrocellulose. Chem. Mater. 2017, 29, 2332.

E. L. Spitler,; Koo, B. T.; Novotney, J. L.; Colson, J. W.; Uribe-Romo, F. J.; Gutierrez, G. D.; Clancy, P.; Dichtel, W. R. A 2D Covalent Organic Framework with 4.7-nm Pores and Insight into Its Interlayer Stacking. J. Am. Chem. Soc. 2011, 133 (48), 19416-19421.

G. Das, B. P. Biswal, S. Kandambeth, V. Venkatesh, G. Kaur, M. Addicoat, T. Heine, S. Verma, R. Banerjee. Chemical sensing in two dimensional porous covalent organic nanosheets. Chem. Sci. 2015, 6, 3931.

H. Fan, M. Peng, I. Strauss, A. Mundstock, H. Meng, J. Caro. High-flux vertically aligned 2D covalent organic framework membrane with enhanced hydrogen separation. J. Am. Chem. Soc. 2020, 142, 6872.

H. Li, A. M. Evans, I. Castano, M. J. Strauss, W. R. Dichtel, J.-L. Bredas. Nucleation-elongation dynamics of two-dimensional covalent organic frameworks. J. Am. Chem. Soc. 2020, 142, 1367.

H. Wang, Z. Zeng, P. Xu, L. Li, G. Zeng, R. Xiao, Z. Tang, D. Huang, L. Tang, C. Lai. Recent progress in covalent organic framework thin films: fabrications, applications and perspectives. Chem. Soc. Rev. 2019, 48, 488.

I. Castano, A. M. Evans, H. Li, E. Vitaku, M. J. Strauss, J.-L. Bredas, N. C. Gianneschi, W. R. Dichtel. Chemical control over nucleation and anisotropic growth of two-dimensional covalent organic frameworks. ACS Cent. Sci. 2019, 5, 1892.

J. M. Rotter, S. Weinberger, J. Kampmann, T. Sick, M. Shalom, T. Bein, D. D. Medina. Covalent organic framework films through electrophoretic deposition—creating efficient morphologies for catalysis. Chem. Mater. 2019, 31, 10008.

J. W. Colson, J. A. Mann, C. R. DeBlase, W. R. Dichtel. Patterned growth of oriented 2 D covalent organic framework thin films on single-layer graphene. J. Polym. Sci. Pol. Chem. 2015, 53, 378.

K. Dey, M. Pal, K. C. Rout, S. Kunjattu H, A. Das, R. Mukherjee, U. K. Kharul, R. J. J. o. t. A. C. S. Banerjee. Selective Molecular Separation by Interfacially Crystallized Covalent Organic Framework Thin Films. J. Am. Chem. Soc. 2017, 139, 13083.

K. Novoselov; Mishchenko, A.; Carvalho, A.; Neto, A. C., 2D materials and van der Waals heterostructures. Science 2016, 353 (6298), 9439.

L.-Y. Chang, M.-Y. Chuang, H.-W. Zan, H.-F. Meng, C.-J. Lu, P.-H. Yeh, J.-N. Chen. One-minute fish freshness evaluation by testing the volatile amine gas with an ultrasensitive porous-electrode-capped organic gas sensor system. ACS Sens. 2017, 2, 531.

M. Boutamine, O. Lezzar, A. Bellel, K. Aguir, S. Sahli, P. Raynaud. Determination of volatile organic compounds using quartz crystal microbalances coated with hexamethyldisiloxane. Anal. Lett. 2018, 51, 387.

M. Ratsch, C. Ye, Y. Yang, A. Zhang, A. M. Evans, K. Börjesson. All-carbon-linked continuous three-dimensional porous aromatic framework films with nanometer-precise controllable thickness. J. Am. Chem. Soc. 2020, 142, 6548.

M. S. Lohse, T. Bein. Covalent organic frameworks: structures, synthesis, and applications. Adv. Func. Mater. 2018, 28, 1705553.

M. Zhang, L. Li, Q. Lin, M. Tang, Y. Wu, C. Ke. Hierarchical-Coassembly-Enabled 3D-Printing of Homogeneous and Heterogeneous Covalent Organic Frameworks. J. Am. Chem. Soc. 2019, 141, 5154.

N. L. Torad, S. Zhang, W. A. Amer, M. M. Ayad, M. Kim, J. Kim, B. Ding, X. Zhang, T. Kimura, Y. Yamauchi. Advanced nanoporous material-based QCM devices: A new horizon of interfacial mass sensing technology. Adv. Mater. Interfaces 2019, 6, 1900849.

P. Albacete, A. López-Moreno, S. Mena-Hernando, A. E. Platero-Prats, E. M. Pérez, F. Zamora. Chemical sensing of water contaminants by a colloid of a fluorescent imine-linked covalent organic framework. Chem. Comm. 2019, 55, 1382.

(56) References Cited

OTHER PUBLICATIONS

Q. Gao, X. Li, G.-H. Ning, K. Leng, B. Tian, C. Liu, W. Tang, H.-S. Xu, K. P. Loh. Highly photoluminescent two-dimensional imine-based covalent organic frameworks for chemical sensing. Chem. Comm. 2018, 54, 2349.

Q. Hao, C. Zhao, B. Sun, C. Lu, J. Liu, M. Liu, L.-J. Wan, D. Wang. Confined synthesis of two-dimensional covalent organic framework thin films within superspreading water layer. J. Am. Chem. Soc. 2018, 140, 12152.

R. Kulkarni, Y. Noda, D. K. Barange, Y. S. Kochergin, P. Lyu, B. Balcarova, P. Nachtigall, M. J. Bojdys. Real-time optical and electronic sensing with a B-amino enone linked, triazine-containing 2D covalent organic framework. Nat. Comm. 2019, 10, 1.

R. L. Li, N. C. Flanders, A. M. Evans, W. Ji, I. Castano, L. X. Chen, N. C. Gianneschi, W. R. Dichtel. Controlled growth of imine-linked two-dimensional covalent organic framework nanoparticles. Chem. Sci. 2019, 10, 3796.

R. P. Bisbey, C. R. DeBlase, B. J. Smith, W. R. Dichtel. Two-dimensional covalent organic framework thin films grown in flow. J. Am. Chem. Soc. 2016, 138, 11433.

R. P. Bisbey, W. R. Dichtel. Covalent Organic Frameworks as a Platform for Multidimensional Polymerization. ACS Cent. Sci. 2017, 3, 533.

S. Cao, B. Li, R. Zhu, H. J. C. E. J. Pang. Design and synthesis of covalent organic frameworks towards energy and environment fields. Chem. Eng. J. 2019, 355, 602.

S. Jhulki, A. M. Evans, X.-L. Hao, M. W. Cooper, C. H. Feriante, J. Leisen, H. Li, D. Lam, M. C. Hersam, S. Barlow, W. R. Dichtel, S. R. Marder. Humidity sensing through reversible isomerization of a covalent organic framework. J. Am. Chem. Soc. 2020, 142, 783.

S. Wan; Guo, J.; Kim, J.; lhee, H.; Jiang, D. A Belt-Shaped, Blue Luminescent, and Semiconducting Covalent Organic Framework. Angew. Chem. Int. Ed. 2008, 47 (46), 8826-8830.

S. Yuan, X. Li, J. Zhu, G. Zhang, P. Van Puyvelde, B. Van der Bruggen. Covalent organic frameworks for membrane separation. Chem. Soc. Rev. 2019, 48, 2665.

T. Sick, A. G. Hufnagel, J. Kampmann, I. Kondofersky, M. Calik, J. M. Rotter, A. Evans, M. Doblinger, S. Herbert, K. Peters, T. Bein. Oriented films of conjugated 2D covalent organic frameworks as photocathodes for water splitting. J. Am. Chem. Soc. 2017, 140, 2085.

X. Chen, K. Geng, R. Liu, K. T. Tan, Y. Gong, Z. Li, S. Tao, Q. Jiang, D. Jiang. Covalent Organic Frameworks: Chemical Approaches to Designer Structures and Built-In Functions. Angew. Chem. Int. Ed. 2019, 59, 5050.

X. Ding; Chen, L.; Honsho, Y.; Feng, X.; Saengsawang, O.; Guo, J.; Saeki, A.; Seki, S.; Irle, S.; Nagase, S.; Parasuk, V.; Jiang, D. An n-Channel Two-Dimensional Covalent Organic Framework. J. Am. Chem. Soc. 2011, 133 (37), 14510-14513.

X. Liu, D. Huang, C. Lai, G. Zeng, L. Qin, H. Wang, H. Yi, B. Li, S. Liu, M. Zhang. Recent advances in covalent organic frameworks (COFs) as a smart sensing material. Chem. Soc. Rev. 2019, 48, 5266.

Y. Peng, W. K. Wong, Z. Hu, Y. Cheng, D. Yuan, S. A. Khan, D. Zhao. Room temperature batch and continuous flow synthesis of water-stable covalent organic frameworks (COFs). Chem. Mater. 2016, 28, 5095.

Z. Jiang, GIXSGUI: a MATLAB toolbox for grazing-incidence X-ray scattering data visualization and reduction, and indexing of buried three-dimensional periodic nanostructured films. J. Appl. Cryst. 2015, 48 (3), 917-926.

Z.-H. He, S.-D. Gong, S.-L. Cai, Y.-L. Yan, G. Chen, X.-L. Li, S.-R. Zheng, J. Fan, W.-G. Zhang. A benzimidazole-containing covalent organic framework-based QCM sensor for exceptional detection of CEES. Cryst. Growth Des. 2019, 19, 3543.

Huang. "Multiple-component covalent organic frameworks" 1-38. Nature Communications. 13/8, 14/13/8, 15/13/8, [online]. Jul. 27, 2016; vol. 7, Article 12325; pp. 1-38.

International Search Report, corresponding to PCT/US21/70703, dated Sep. 22, 2022.

* cited by examiner

ADDITIVE MANUFACTURING OF LARGE-AREA COVALENT ORGANIC FRAMEWORK THIN FILMS

CROSS-REFERENCE TO RELATED APPLICATIONS

This application represents the national stage entry of PCT/US2021/070703 filed on Jun. 14, 2021, which claims the benefit of priority to U.S. Provisional Patent Application 63/038,283, filed Jun. 12, 2020, the contents of each are incorporated herein by reference in their entireties.

STATEMENT REGARDING FEDERALLY SPONSORED RESEARCH

This invention was made with government support under W911NF-15-1-0447 awarded by United States Army Research Office and DE-SC0019356 awarded by the Department of Energy. The government has certain rights in the invention.

FIELD OF THE INVENTION

The disclosed technology is generally directed to additive manufacturing of large-area covalent organic framework thin films.

BACKGROUND OF THE INVENTION

Two-dimensional covalent organic frameworks (2D COFs) are a unique materials platform that combines covalent connectivity, structural regularity, and molecularly precise porosity. However, as-synthesized 2D COFs typically form aggregates that cannot be dispersed in solution, thus limiting their reliable integration into devices via additive manufacturing.

Two-dimensional covalent organic frameworks (2D COFs)[1, 2] are structurally regular and versatile (>400 reported structures) layered 2D polymers with high surface areas (>2000 $m^2$ $g^{-1}$) and robust covalent bonds. 2D COFs are promising for applications including nanofiltration membranes,[3-5] charge-storage devices,[6-8] and chemical sensors,[9-16] among others. Despite this promise, conventionally isolated polycrystalline 2D COF powders are insoluble and traditionally improcessable, which has limited their integration into thin-film device architectures[17-19] This limitation has inspired the exploration of numerous thin-film fabrication approaches including direct polymerizations on substrates,[20, 21] continuous flow,[22-24] interfacial polymerization,[3, 25, 26] and electrophoretic deposition.[27] However, none of these methods are general across many substrate materials, amenable to scale-up, easily patternable, and operationally simple. Although these emerging fabrication approaches and initial devices demonstrate the great potential of 2D COF films, their technological promise is largely restricted by the absence of a scalable production technique.

BRIEF SUMMARY OF THE INVENTION

Systems and methods for preparing covalent organic framework (COF) thin films is disclosed herein. One aspect of the invention is a system for preparing COF thin films comprising a reservoir comprising a COF colloidal ink therein, a nozzle configured to direct the COF colloidal ink onto a substrate, and a pneumatic system configured to expel a plurality of COF colloidal ink drops having an effective deposition diameter from the nozzle onto the substrate. The system may further comprise a heating stage configured to heat the substrate to an effective COF deposition deposition temperature. In some embodiments, the effective deposition diameter of the plurality of COF colloidal ink drops have a maximum diameter of less than 20 μm onto the substrate.

Another aspect of the invention is a method for preparing a COF thin film comprising expelling a plurality of COF colloidal ink drops having an effective deposition diameter from a nozzle onto the substrate. The method may further comprise heating the substrate to an effective deposition temperature and/or masking the substrate. Suitably, the method may be performed with any of the systems for preparing a COF thin film described herein.

Another aspect of the invention are COF thin films and COF thin film compositions prepared by any of the methods disclosed herein. In some embodiments, the COF thin film composition further comprises a substrate. Suitably, the COF thin film may comprise two or more different COFs. The two or more different COFs may be homogeneously distributed on a substrate. In other embodiments, the two or more different COFs may be homogeneously distributed on a substrate.

These and other aspects of the technology will be further described herein.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention.

FIG. 1A) Synthesis of boronate-ester linked COF colloidal inks. FIG. 1B) Patterned spray-coating of COFs over a stencil mask.

FIG. 2A) Optical image of COF-5 ink. FIG. 2N) Patterned COF-5 print on Kapton.

FIG. 3A) X-ray scattering patterns of printed COF materials (circles) and their simulated scattering patterns (lines). FIG. 3B) XRD pattern of COF-5, TP-COF, and their mixed print. FIG. 3C) XRD pattern of a mixed TP-COF, DPB-COF, and their mixed print.

DETAILED DESCRIPTION OF THE INVENTION

Figure 1A:
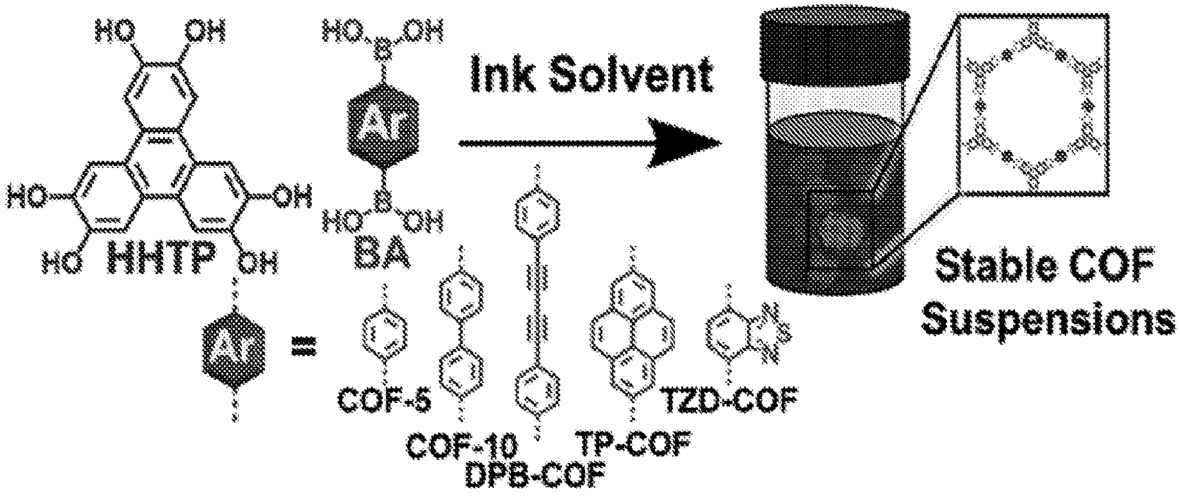
FIGS. 1A-1B.

Herein we disclose the additive manufacturing of COF thin films. Large-area 2D COF thin-films may be spray coated without the need for additional post-synthetic processing. This scalable additive manufacturing approach is synthetically general as demonstrated with five different 2D COFs prepared as colloidal inks and subsequently spray-coated onto various substrates. Moreover, this method enables the deposition of multiple 2D COF materials simultaneously, which is not possible by polymerizing the COF on the substrate directly. When combined with stencil masks, spray-coated 2D COFs are deposited in minutes as thin films larger than 200 $cm^2$ with line resolutions below 50 μm.

As used herein, a "covalent organic framework" or "COF" is a two- or three-dimensional organic solid with extended, periodic, and porous structures in which a plurality of linking groups (LGs) and functional building units (FBUs) are linked by covalent bonds. Suitably, COFs may be made entirely from light elements, such as, H, B, C, N, O, or any combination thereof. Two-dimensional COFs can self-assemble into larger structures. In some embodiments, layered COF sheets adopt nearly eclipsed stacked structures, providing continuous nanometer-scale channels normal to the stacking direction as well as significant π-orbital overlap between monomers in adjacent layers. These features can provide an accessible high surface area interface for double-layer formation and pathways for charge transfer to/from, for example, redox-active groups that comprise the walls of the channels.

COFs are crystalline. COFs can form crystallites (i.e., discrete structures) where the longest dimension of the crystallites can be from 50 nm to 10 microns, including all values in the range therebetween. In various embodiments, the COF comprise at least 2 unit cells, at least 5 unit cells, and at least 10 unit cells.

The COFs may be present as a thin film. Exemplary thin films may have a thickness of 10 nm to 10 microns, 20 nm to 2 microns, 50 nm to 1 micron, including all values and ranges therebetween.

COFs may be porous. In some embodiments, COFs may be microporous. For example, microporous COFs may have pores with a longest dimension of less than 2.0 nm, suitably, less than 1.8 nm, 1.6 nm, 1.4 nm, 1.2 nm, or less than 1.0 nm. In some embodiments, COFs may be mesoporous structure. Mesoporous COFs may have pores with a longest dimension of 2 nm to 50 nm, including 5 nm to 40 nm or 10 nm to 30 nm. In some embodiments, the porous structure forms a repeating pattern (i.e., not a random distribution of pores). In some embodiments, COFs may have pores that run parallel to stacked aromatic moieties.

COFs can have high surface area. For examples, the COFs can have a surface area 500 $m^2/g$ to 2500 $m^2/g$, including all values to the $m^2/g$ and ranges of surface area therebetween. The surface area of the COFs can be determined by methods known in the art. For example, the surface area may be determined by BET analysis of gas (e.g., nitrogen) adsorption isotherms.

A "building unit" or "BU" comprises a molecular subunit having two or more functional termini that can be covalently bonded to an equal number of different linker groups (LGs). The linkages between the BUs and LGs provide robust materials with precise and predictable control over composition, topology, and porosity. The relative geometries of the functional termini in the starting materials determine the COFs topology.

In some embodiments, the BUs comprises an aryl BUs. The term "aryl" is art-recognized and refers to a carbocyclic aromatic group. Representative aryl groups include phenyl, naphthyl, anthracenyl, and the like. The term "aryl" includes polycyclic ring systems having two or more carbocyclic rings in which two or more carbons are common to two adjoining rings (the rings are "fused rings") wherein at least one of the rings is aromatic and, e.g., the other ring(s) may be cycloalkyls, cycloalkenyls, cycloalkynyls, and/or aryls. Unless specified otherwise, the aromatic ring may be substituted at one or more ring positions with, for example, halogen, azide, alkyl, aralkyl, alkenyl, alkynyl, cycloalkyl, hydroxyl, alkoxyl, amino, nitro, sulfhydryl, imino, amido, carboxylic acid, —C(O)alkyl, —$CO_2$alkyl, carbonyl, carboxyl, alkylthio, sulfonyl, sulfonamido, sulfonamide, ketone, aldehyde, ester, heterocyclyl, aryl or heteroaryl moieties, or the like. In certain embodiments, the aromatic ring is substituted at one or more ring positions with an amine-terminated substituent or azide-terminated substituents, which may be useful in preparing the amine substituted COF. In certain other embodiments, the aromatic ring is not substituted, i.e., it is unsubstituted. In certain embodiments, the aryl group is a 6-10 membered ring structure.

A "linking group" or "LG" comprises a molecular subunit having two or more functional termini that can be covalently bonded to an equal number of BUs. At least three BUs are each connected to a LG by covalent bond(s) or at least three LGs are each connected to a BU by covalent bond(s). For example, a BU and a LG may be connected by at least one covalent bond. In other examples, the BUs and LGs are connected by one covalent bond, two covalent bonds, or three covalent bonds. The BUs and LGs can be connected by, for example, carbon-boron bonds, carbon-nitrogen bonds (e.g., an imine bond or a hydrazone bond), carbon-oxygen bonds, carbon-carbon bonds, or boron-oxygen bonds (e.g., boronate ester bonds).

LGs may be selected to prepare a COF having a desired geometry and/or porosity. Exemplary LGs may be selected to allow for the formation of COFs having 2-D or 3-D arrangements. LGs suitable for formation of 2-D COFs include, without limitation, LGs having trigonal planar, square planar, or hexagonal planar geometries. LGs suitable for formation of 3-D COFs include, without limitation, LGs having tetrahedral or octahedral geometries. Suitably, the COFs may comprise LGs having trigonal planar geometries such as 1,3,5-trisphenyl benzene linking groups.

COF colloidal inks may be prepared from the COFs described herein. A "COF colloidal ink" is a stable colloid suspension comprising a dispersion of COF crystals in a continuous phase. The COF crystals may have a diameter from about 10-2000 nm, including any value or range therebetween. For example, the COF crystals may have a diameter of 20-200 nm or 30-100 nm. In the Examples that follow, the COF crystals have a diameter of about 50 nm, but other size COF crystals can be used to prepare COF thin films. Methods of preparing colloidal COFs are disclosed in Evans, A. M.; et al., Seeded Growth of Single-Crystal Two-Dimensional Covalent Organic Frameworks. *Science* 2018, 361, 52-57.

When COF colloidal inks are deposited on the surface of a substrate, the COF crystals retain their crystallinity. This allows for the rapid deposition of COFs over large surface areas as described by the Examples.

The COF colloidal ink may be comprised of a single COF or two or more different COFs. When the ink comprises two or more COFs, the different COF crystals may be simultaneously deposited on the substrate. This allows for the preparation of COF thin films that have the two or more different COFs homogenously distributed on the substrate. Such COF thin films are impossible to prepare by conventional polymerization of COF films directly on a substrate.

Systems and methods for preparing COF thin films are disclosed herein. Systems for preparing COF thin films are systems configured for the deposition of COF colloidal inks onto a system. Suitably, such systems comprises a reservoir for containing the COF colloidal ink to be delivered to the surface, a nozzle configured to direct the ink onto the substrate, and a pneumatic system configured to expel a plurality of COF colloidal ink drops having an effective deposition diameter from the nozzle onto the substrate.

In some embodiments, the pneumatic system is a compressed air sprayer such as a spray gun. The COF may be applied to the surface through the use of compressed air or other suitable pressurizing gas that mixes with the COF colloidal ink to atomize the ink into drops having the effective deposition diameter. As used herein, an "effective deposition diameter" is a drop size effective in depositing a COF crystal onto the substrate. The effective deposition diameter may be less than about 100 μm, but smaller diameters are preferred for preparation of more closely packed or dense COF thin films. Suitably, the effective deposition diameter may be less than 60 μm, 40 μm, 20 μm, 10 μm, or 5 μm.

The character of the thin film deposited may be affected by several interrelated parameters that affect the size of droplets that exit the spray coater, time of flight of droplets from the nozzle to the substrate, and rates of solvent evaporation in air and on the substrate. Variation of these conditions allows for the controlled preparation of closed packed or dense COF films.

After inks are deposited on the substrate, the drying conditions dictate the morphology of the resulting films. Large drops of ink that evaporate quickly can result in all of the material drying at the edges of the drop. If material is already deposited, new drops can also push that material to the edges of the drop, resulting in an inhomogeneous fractal-like pattern that can be observed under optical microscopy. By increasing the atomization rate of the ink when spray coating, smaller drops can be generated to allow for more favorable drying conditions. The number of drops, along with the time of flight between the nozzle and substrate, also affect the drying conditions. By increasing the atomization rate and optimizing the mixture of pressurized air to ink, it is possible to deposit a layer of drops that dry as they make contact with the substrate. This condition allows for continuous spraying of material onto the substrate that gives higher film homogeneity and eliminates the need to repeatedly trigger the spray coater to deposit more material. This procedure more than halves the amount of time required to deposit COFs on the substrate. The resulting films are also more closely compacted.

The higher the ink to pressurized air ratio, the more ink is deposited on the surface at one point. This can cause slower evaporation because of large amounts of solvent present at one time on the surface. Lower ink to air ratios also allows for more air to pass over the surface of drops as they leave the nozzle. This causes evaporation on the surface of the drops that makes the drops smaller when deposited on the substrate. Large ink droplets dry slower, cause ink to dry only at the edges, and can push previously deposited material to the edges of the drop. By lowering the ink to air ratio and decreasing the droplet size, we create conditions that allow for nearly instantaneous drying as the ink is deposited even when the nozzle is more than 50% closer. The instantaneous drying also allows for continuous spray deposition and moving the nozzle closer to the substrate. This helps concentrate the ink in a smaller region and prevent overspray onto the stencil.

The system may also comprise a heating stage configured to heat the substrate to an effective COF deposition temperature. Controlling the temperature of the substrate allows for controlling of the drying conditions for when the plurality of COF colloidal ink drops contact the substrate.

In some embodiments, the system comprises a COF colloidal ink flow regulator, a pressurizing gas flow regulator, and a pneumatic control system. The pneumatic control system may be configured to regulate the COF colloidal ink flow regulator and/or the pressurizing gas flow regulator to modulate the effective deposition diameter. In some embodiments, the control system may be a manual control system configured for direct user interaction to modulate the effective deposition diameter. In other embodiments, the control system may be an automated control system configured to modulate the effective deposition diameter without direct user interaction.

In some embodiments, the systems and methods may be used to expel two or more different COF colloidal inks. This can allow for the preparation of materials having inhomogeneous distributions of different COFs on the substrate. This allows for the preparation of a variety of COF compositions that cannot be prepared by direct synthesis on the substrate. In some embodiments, the COF compositions may have different COF thin films present over different regions of the substrate. In other embodiments, a layered thin films of one or more COF thin films is deposited on top of another, different COF thin film. In yet another embodiment, the COF thin film may have differing film thicknesses across the substrate. In a particular embodiment, the COF thin film may be graduated across the substrate to provide a continuously varying film thickness. In yet another embodiments, a gradient thin film may be prepared that transitions from on COF material to a different one. Each of these compositions may be prepared by control of the depositions for the COF colloidal ink, use of two or more different COF colloidal inks, use of two or more different systems for preparing the COF thin films, or any combination thereof.

Substrates for use with the methods disclosed herein include any material suitable for the deposition of the COF. In some embodiments, the substrate is polymer substrate, a metal substrate, or an oxide substrate. As demonstrated in the Examples, COF thin films may be prepared on each of these different materials.

In some embodiments, the substrates are masked before deposition of the COF, This allows for the patterning of COF thin films on the substrates. Suitably, the substrate may be masked with a conformal mask or stencil, such as an elastomer such as PDMS. The substrate may also be masked by nonconformal masks or stencils, such as a metal stencil. When nonconformal masks are used to mask the substrate, force may be applied between the mask and substrate to minimize gaps between the mask and substrate to minimize the deposited ink seeping under the mask. The masked may be used to prepare different regions on the substrate where the COF colloidal ink is deposited.

Miscellaneous

Unless otherwise specified or indicated by context, the terms "a", "an", and "the" mean "one or more." For example, "a molecule" should be interpreted to mean "one or more molecules."

As used herein, "about", "approximately," "substantially," and "significantly" will be understood by persons of ordinary skill in the art and will vary to some extent on the context in which they are used. If there are uses of the term which are not clear to persons of ordinary skill in the art given the context in which it is used, "about" and "approximately" will mean plus or minus ≤10% of the particular term and "substantially" and "significantly" will mean plus or minus >10% of the particular term.

As used herein, the terms "include" and "including" have the same meaning as the terms "comprise" and "comprising." The terms "comprise" and "comprising" should be interpreted as being "open" transitional terms that permit the inclusion of additional components further to those components recited in the claims. The terms "consist" and "consisting of" should be interpreted as being "closed" transitional terms that do not permit the inclusion additional components other than the components recited in the claims. The term "consisting essentially of" should be interpreted to be partially closed and allowing the inclusion only of additional components that do not fundamentally alter the nature of the claimed subject matter.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

All references, including publications, patent applications, and patents, cited herein are hereby incorporated by reference to the same extent as if each reference were individually and specifically indicated to be incorporated by reference and were set forth in its entirety herein.

Preferred aspects of this invention are described herein, including the best mode known to the inventors for carrying out the invention. Variations of those preferred aspects may become apparent to those of ordinary skill in the art upon reading the foregoing description. The inventors expect a person having ordinary skill in the art to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

EXAMPLES

Figure 1B:
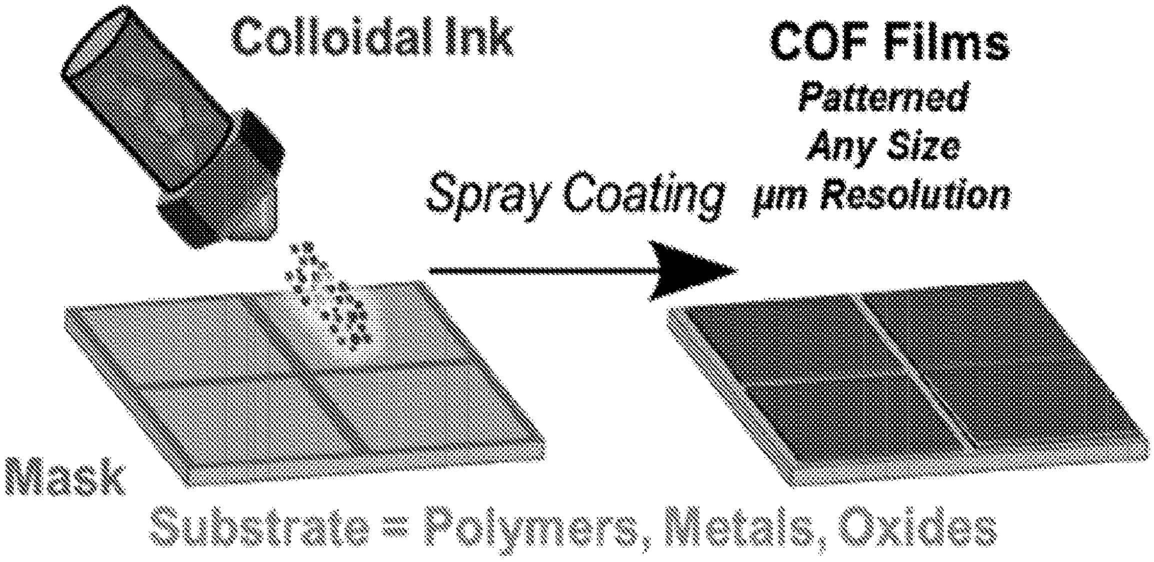

Several 2D COFs were prepared as stable colloidal suspensions, a form amenable to solution-processing methods (FIG. 1A).[28-33] Here we spray-coat 2D COF colloidal suspensions as thin-films that retain their crystallinity, as assessed by X-ray diffraction (XRD) (FIG. 1B). This additive manufacturing approach is demonstrated for five 2D COFs on metal, polymer, and oxide substrates. Spray coating is rapid, patternable, and highly scalable. It also enables mixtures of different COF colloids to be co-deposited in controlled ratios. We spray-coated 2D COF thin-films with sizes in excess of 200 $cm^2$ with sub-50 μm line resolution using a commercial airbrush, and industrial spray-coating can provide print areas many orders of magnitude larger using similar inks.

Figures 2A, 2B, 2C, 2D, 2E:
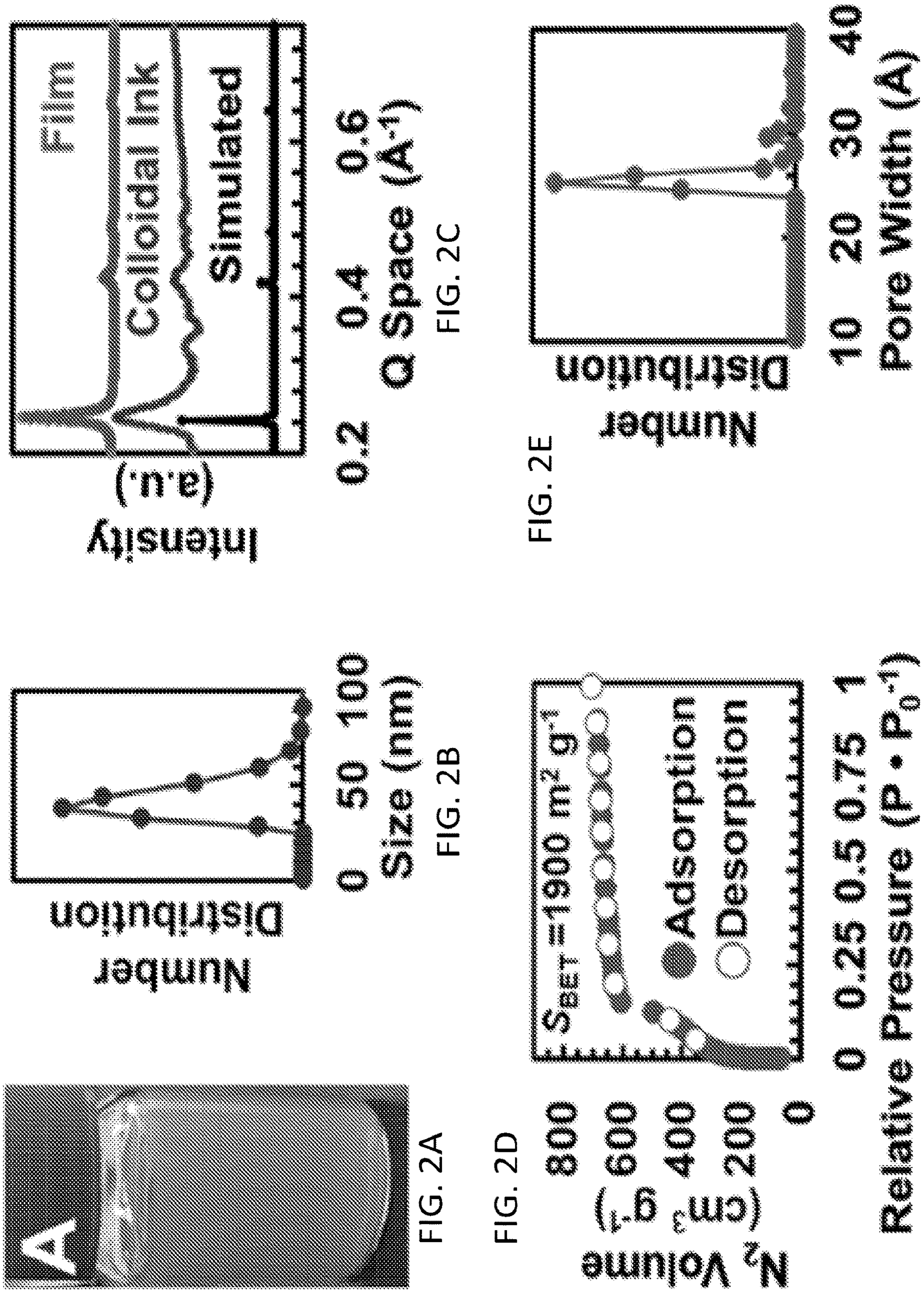
FIGS. 2A-2N.
FIG. 2B) DLS number distribution of COF-5 inks.
FIG. 2C) XRD patterns of COF-5 inks and films.
FIG. 2D) $N_2$ isotherm of a COF-5 film and (FIG. 2E) its extracted pore size distribution.
Figure 2G:
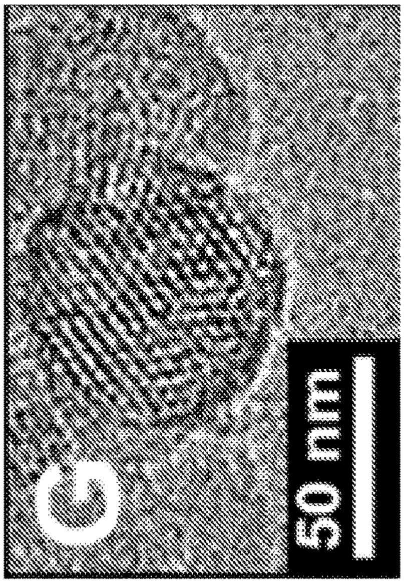
FIG. 2F) TEM image of a population of COF-5 particles and (FIG. 2G) enlarged face-on particle with its (FIG. 211) fast Fourier transform. I) SEM image of a spray-coated COF film.
FIG. 2J) Fine-resolution print of COF-5 squares and (FIG. 2K) its magnified optical microscopy image on $SiO_2$.
FIG. 2L) COF-5 spray-coated on a Ti QCM wafer.
FIG. 2M) Large-area COF-5 print on $SiO_2$.
Figure 2H:
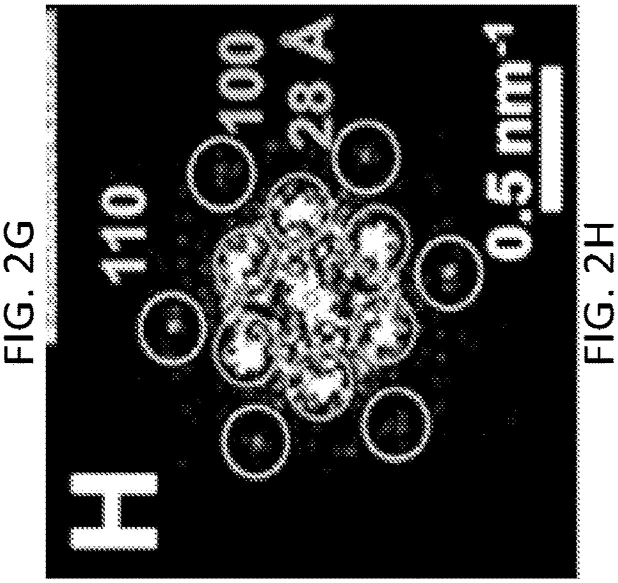
Figure 2F:
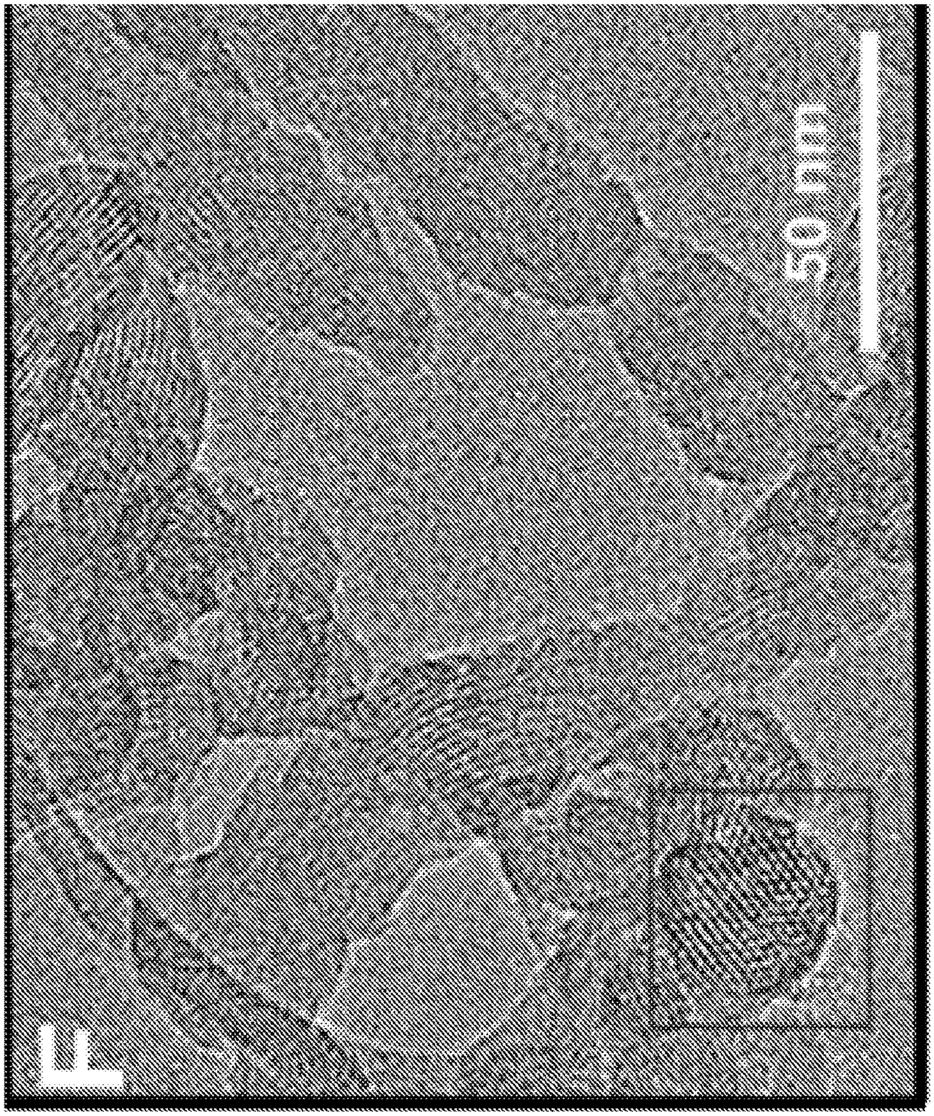
Figure 2I:
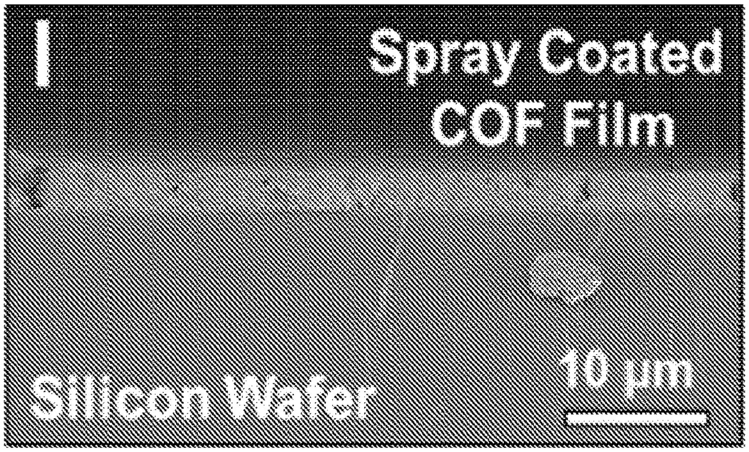

Boronate ester-linked 2D COFs were prepared as colloidal nanoparticle solutions to be used as inks for spray coating (FIGS. 1A and 2A).[28, 31, 38] In situ dynamic light scattering (DLS, FIG. 2B) and XRD (FIG. 2C) indicated that the solutions contain 2D COFs as crystalline nanoparticles 50 nm in diameter. Diffraction patterns of evaporated COF-5 inks that were dropcast onto a $SiO_2$ wafer and heated to 100° C. retained their crystallinity (FIG. 2C) and exhibit nitrogen isotherms, surface areas, and pore size distributions consistent with pristine COF-5 materials (FIGS. 2D-E). The crystallinity and uniformity of these films is consistent with transmission electron micrographs that indicate that the COF-5 particles are single-crystalline and approximately 50 nm in diameter (FIGS. 2F-H). Taken together, these experiments demonstrate that COF-5 inks survive deposition without substantial loss of their quality.

Figure 2J:
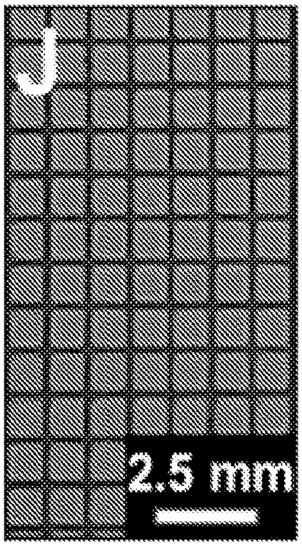
Figure 2K:
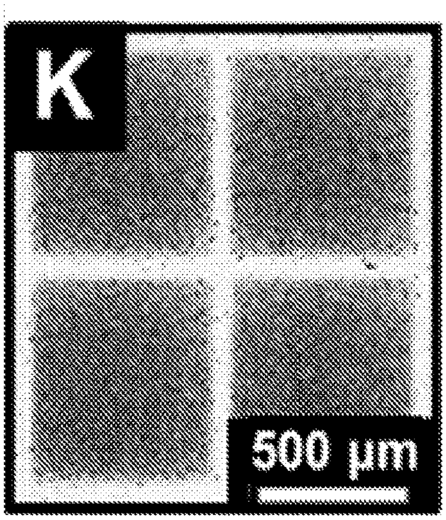
Figure 2L:
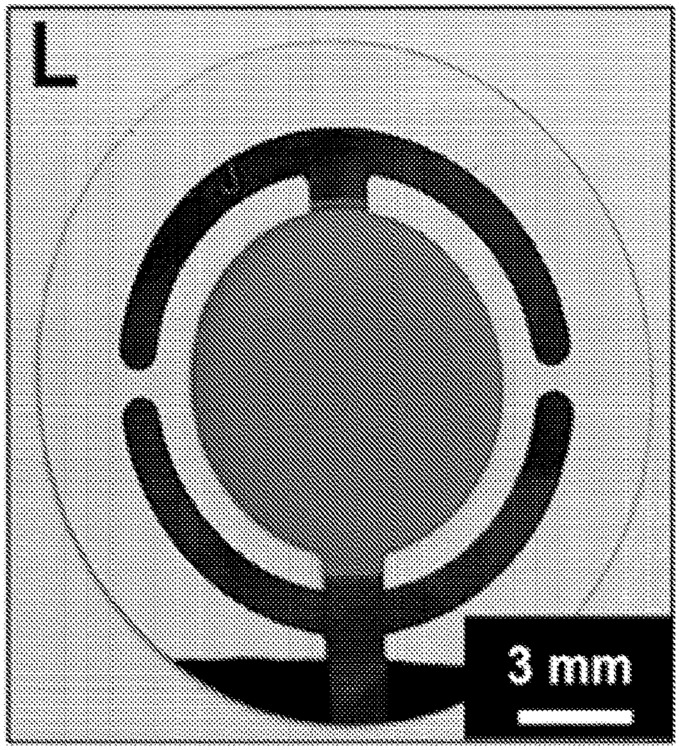
Figure 2M:
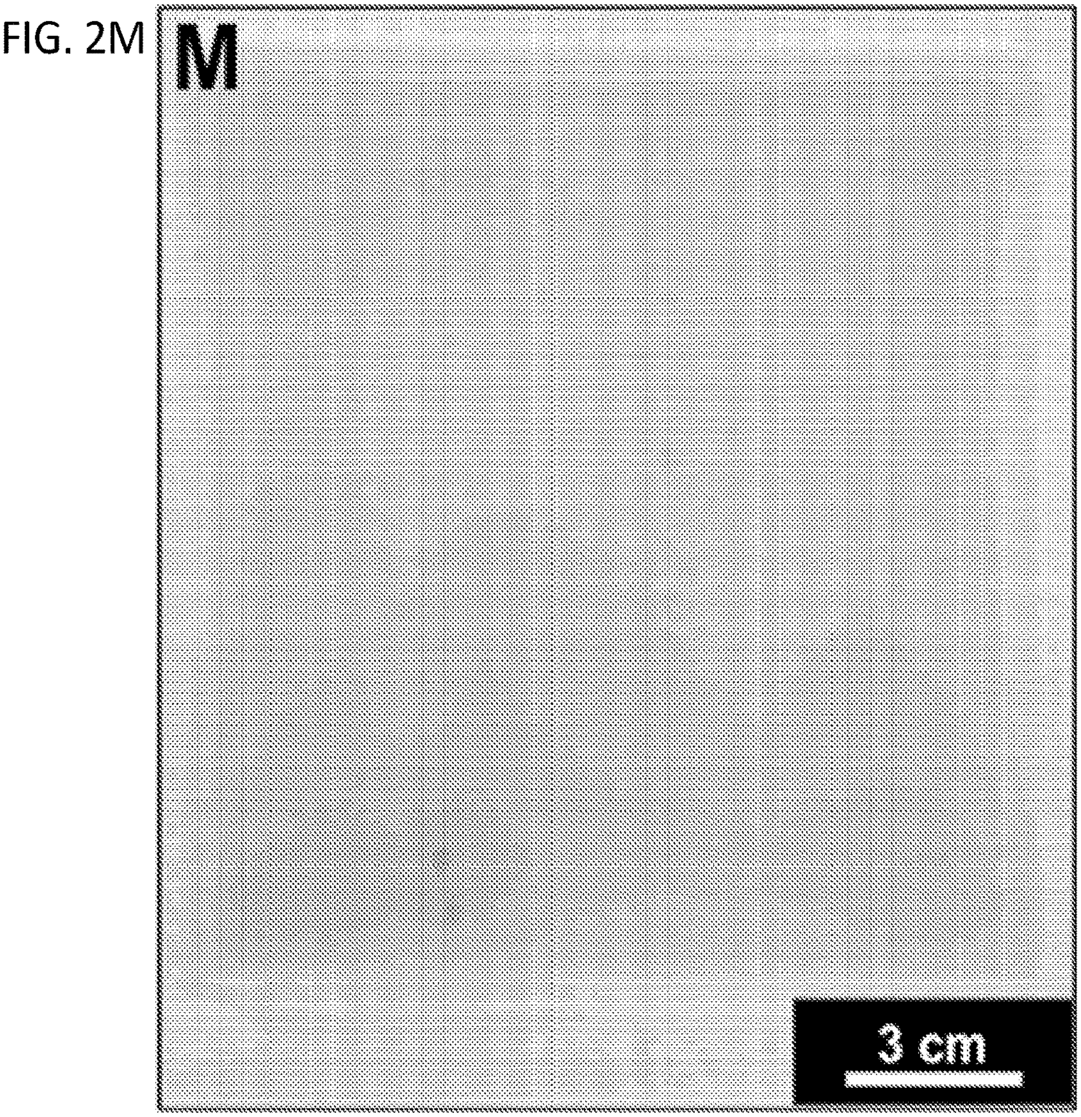
Figure 2N:
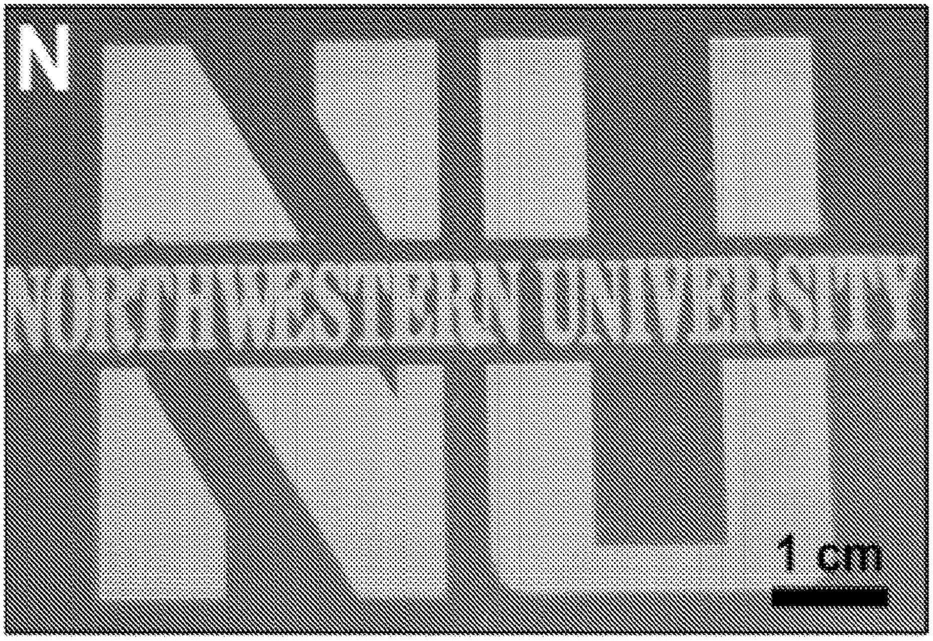

Spray-coating COF-5 colloidal inks through stencil masks provides homogenously patterned COF thin-films. By fixing a commercial Iwata airbrush 8 cm from a substrate preheated to 100° C., we deposit as-prepared COF colloidal suspensions as optically uniform films in less than five minutes. Furthermore, spray-coating is amenable to depositing COF-5 films on oxides, metals, and polymers (FIGS. 21-2N). Isotropic XRD patterns are consistent with simulated COF-5 patterns and show that inks are deposited as randomly oriented crystallites. To evaluate scalability, we prepared a 225 $cm^2$ COF-5 thin-film, one of the largest prepared to date, by patterning a square with masking tape and depositing COF-5 ink over it (FIG. 2M).[27] An optically homogenous macroscopic array of finely printed COF-5 squares had line-resolutions smaller than 50 μm (FIGS. 2J-K). Finally, we cut a patterned mask with centimeter dimensions and deposited COF ink over it (FIG. 2N). These prints have tight line edges and optically homogenous print thickness, demonstrating that this method can be used to fabricate COF thin-films in a spatially controlled way, at-scale, with high resolution.

Figure 3C:
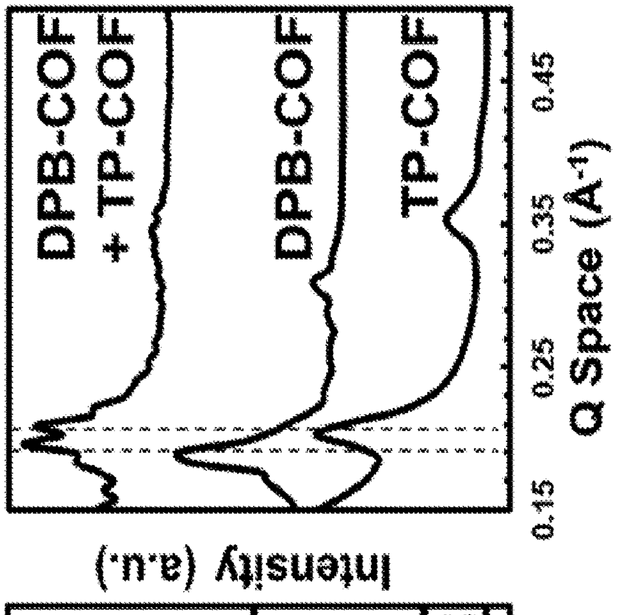
FIGS. 3A-3C.
Figure 3B:
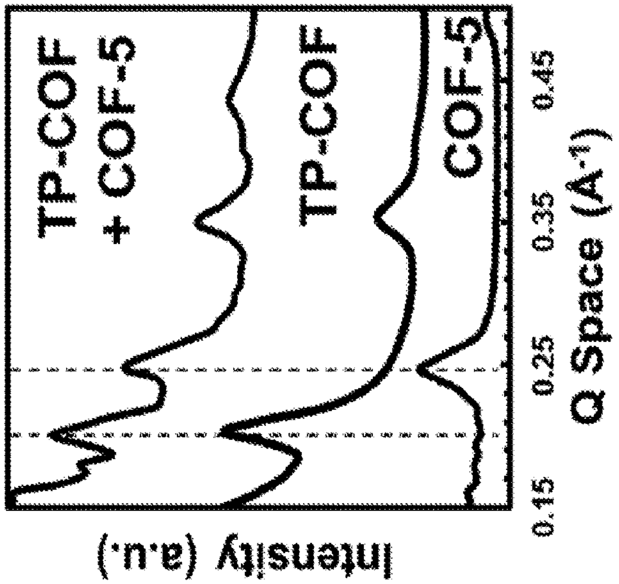
Figure 3A:
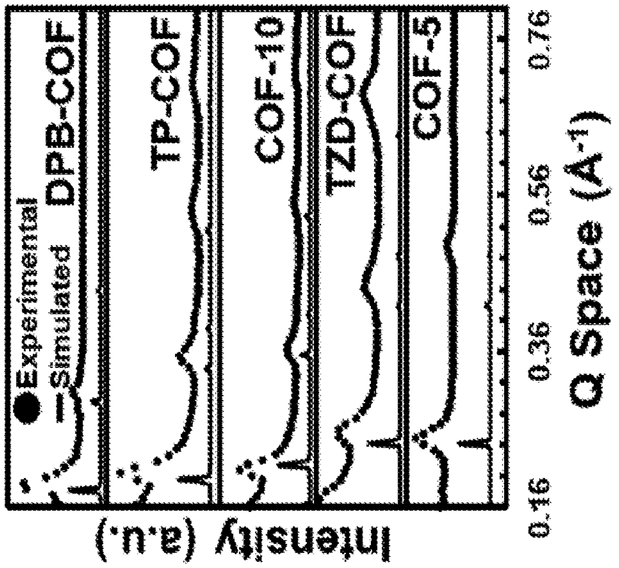

After characterizing films comprised of COF-5, the generality of this method was evaluated for five 2D COFs thin-films. To fabricate these films, we first synthesized COF colloidal suspensions, all of which were found to be approximately 50 nm by DLS and highly crystalline by in situ XRD. The resulting spray-coated 2D COF films were highly crystalline with XRD patterns matching simulated patterns, showing that all of the COFs survived the deposition procedure (FIG. 3A). Given access to multiple 2D COF inks, spray coating enables facile deposition of sequential layers or larger amounts of material. Three volumes of TP-COF inks were deposited (500, 1000, and 1500 μL), and their XRD patterns are indistinguishable (data not shown). Scanning electron microscopy (SEM) shows that low volume prints of TP-COF are sub-full coverage, which is not trivially achieved using conventional methods. One of the unique capabilities of spray-coating COF inks is the ability to mix two or more COFs inks, allowing the materials to be co-deposited. It is not possible to obtain such combined compositions by directly growing COF films on a substrate. Two mixed ink formulations were created containing TP-COF:COF-5 and TP-COF:DPB-COF in 1:1 vol ratios. In both cases, XRD patterns of these printed films had diffraction features corresponding to both materials, indicating that two populations of nanoparticles have been deposited (FIGS. 3B and 3C).

2D COF active layers were incorporated into acoustic sensing devices by spray-coating 500 μL of COF-5 ink onto Ti-coated QCM acoustic resonators. These films appeared uniform by optical microscopy, but SEM revealed microscale inhomogeneity likely caused by the rapid drying of low-boiling solvents during deposition. Although high-boiling solvents might reduce the inhomogeneity, this change would require hotter processing conditions not compatible with QCM wafers.[39]

In conclusion, we report a simple, patternable, and scalable method to process 2D COF colloids from solution onto arbitrary substrates. This capability enables their integration, both as pure materials and as mixtures, into thin-film devices. Five 2D COF colloidal inks were spray-coated at high speed, large-scale, and micron-scale resolution to form thin-films onto a different substrates. This powerful fabrication approach will enable the unique characteristics of 2D COFs to be leveraged for additive manufacturing of large-area COF thin films.

Materials

Reagents were purchased from commercial grade suppliers and used without further purification, unless otherwise described. Anhydrous solvents were obtained from a solvent purification system (JC Meyer System).

Instrumentation and Methods

Sonication. Sonication was performed with a Branson 3510 ultrasonic cleaner with a power output of 100 W and a frequency of 42 kHz.

In Situ Wide-Angle X-Ray Scattering (WAXS). Small- and wide-angle X-ray scattering (SAXS/WAXS) patterns were collected at Argonne National Lab's (ANL) Advanced Photon Source (APS) at both sectors 5-IDD (DND-CAT) and 12-ID-D with a capillary transmission geometry. All liquid cell experiments were conducted on COF colloids as prepared. Experiments conducted at 12-ID-D were collected at a beam energy of 12 keV and experiments conducted at 5-ID-D were collected at a beam energy of 13.3 keV. Individual frames were collected on a set of Pilatus detectors, which were then summed and radially integrated to produce a linear XRD pattern using proprietary software available at the APS. Scattering intensity is reported as a function of the modulus of the scattering vector q, related to the scattering angle 2θ by the equation $q=(4\pi/\lambda)\sin\theta$, where λ is the X-ray wavelength. The sample-to-detector distance was adjusted to measure across relevant detection ranges. Capillary experiments were conducted using 2.0 mm OD borosilicate capillaries with 0.2 mm wall thicknesses purchased from Hilgenberg GmbH.

Grazing Incidence X-Ray Diffraction (GI-XRD). GI-XRD measurements were then performed at Advanced Photon Source (APS) at Argonne National Laboratory (ANL) using the 8-ID-E Beamline under vacuum. The crystallites were irradiated until the detector was 80% of saturated an incidence angle of 0.14° in vacuum using 10.92 keV (1.135 Å) X-rays. The scattering was recorded on a Pilatus 1 M detector located 228 mm from the sample. In all cases, significant silicon substrate scatter was observed. The raw images were merged, pixel coordinates were transformed to q-space, line cuts generated using GIXSGUI for Matlab.

COF Modeling and Structural Refinement. Crystal modeling of the COF structures was carried out using the Materials Studio (ver. 5.0) suite of programs by Accelrys. The initial structures were S5 constructed piecewise starting with a primitive hexagonal unit cell of a P6 space group. The cell parameter was estimated according to the distance between the center of the vertices for each COF, and c parameter was chosen as 3.35 Å. Initially, these structures were estimated to be eclipsed. The structures were optimized using a Geometry Optimization routine including energy minimization with cell parameters optimization, using the parameters from the Universal Force Field. Calculation of the simulated powder diffraction patterns and Pawley refinements were performed in the Materials Studio Reflex Plus Module using a Bragg-Brentano geometry. When the first ~2 features were seen to align but relative intensities were seen to be inconsistent, we assigned this to a non-eclipsed structure. If this was the case, supercells of the crystallites were generated and different stackings (AB, ABC, partial AB, etc. were attempted). The intensity profile which matched most closely was used to refine. In the COFs reported here, eclipsed structures were found to be most consistent with the diffraction patterns obtained here. Prior to refinement of TZD-COF, the TZD component was assigned to have occupancy on each side of the phenyl ring it is attached to, so as to account for its prochirality. The observed diffraction patterns were subjected to a polynomial background subtraction and then to Pawley refinement wherein peak profile were refined using the Pseudo-Voigt peak shape function and asymmetry was corrected using the Berar-Baldinozzi function. Crystallite size was then estimated by the LeBail method which was Pawley refined to the experimental data.

Dynamic Light Scattering (DLS). Dynamic Light Scattering (DLS) data were collected using a Malvern Zetasizer equipped with a 633 nm He—Ne 5 mW laser at room temperature in a quartz cuvette with a 10 mm pathlength. All DLS scattering vectors were interpreted with a spherical shape factor. Data was analyzed using the proprietary Zetasizer software.

Nanoparticle Tracking Analysis (NTA). Nanoparticle tracking analysis was conducted on COF colloids as prepared using a Malvern Nanosight300 using a 488 nm laser module. NTA was equipped with quartz windows and metal interlocks to prevent damage by the organic solvents used. 100 μL of COF colloids were loaded in between the quartz windows at which point the instrument was calibrated for a depth of view as to maximize the photon efficiency. Videos were then taken.

Nitrogen Sorption Measurements. Gas sorption isotherms were conducted on a Micromeritics ASAP 2420 Accelerated Surface Area and Porosity Analyzer. Typically, 20-40 mg samples were transferred to dried and tared analysis tubes and capped with a Transeal. The samples were heated to 40° C. at a rate of 1° $C.\cdot min^{-1}$ and evacuated at 40° C. for 20 min, then heated to 100° C. at a rate of 1° $C.\cdot min^{-1}$ heat, and evacuated at 100° C. until the outgas rate was ≤0.4 $\mu mHg\cdot min^{-1}$, at which point the tube was weighed again to determine the mass of the activated sample. The tube was then transferred to the analysis port of the instrument. UHP-grade (99.999% purity) $N_2$ was used for all adsorption measurements. $N_2$ isotherms were generated by incremental exposure to nitrogen up to 760 mmHg (1 atm) in a liquid nitrogen (77 K) bath. Oil-free vacuum pumps and oil-free pressure regulators were used for all measurements. Brunauer-Emmett-Teller (BET) surface areas were calculated from the linear region of the $N_2$ isotherm at 77 K within the pressure range P/Po of 0.05-0.10.

Scanning Electron Microscopy (SEM). Samples collected for SEM characterization had COF spray coated onto silica wafers or titanium coated silica wafers using a PDMS mask to limit the area of deposition. The samples were then cleaved and mounted with carbon tape or double-sided copper tape on vertical SEM mounts. Each sample was coated with 7 nm of osmium to create a conformal conductive coating prior to imaging. Images were collected with a Hitachi SU 8030 scanning electron microscope.

Optical Microscopy. Optical images were collected with an Olympus BX51RF Microscope from samples with COF spray coated onto the surface titanium coated silica wafers. Both metal and PDMs stencils were used for patterning COFs in images collected. Images of large area prints were taken with a Canon EOS Rebel T3i and Samsung S9 cell phone built in camera.

Profilometry. Film height characterization was completed with a Veeco Dektak 150 Surface Profiler with a 5 μm stylus tip and 5 mN of downward force. Films characterized were coated on QCM wafers with a PDMS mask with a 2.2225 cm (⅞ in) diameter hole.

COF Printing. Spray coating of samples was completed with an Iwata HP-CH Airbursh connected to a Dewalt Pancake Air Compressor with a pressure reducer between the compressor and air brush. For mounted deposition of material, the airbrush was mounted on a lab stand with two three armed clamps 8 cm above the hotplate surface. The hotplate was heated to 100° C. and the substrate was placed beneath the nozzle with a PDMS mask or a metal mask held with rare earth magnets. A pressure of 20 PSIG was applied to the air brush and the atomizer nozzle on the Iwata airbrush was fully open. Prior to coating the first sample, 0.25 ml of ink was deposited onto aluminum foil to prime the airbrush and ensure the full amount of material was deposited on the substrate of interest. For larger samples, the substrates were placed on a hotplate heated to 100° C. and COFs were deposited with a handheld airbrush moved above the substrate to coat the entire area.

Substrate Patterning. Patterning of COF on substrates was completed with metal and PDMS masks. For the PDMS mask, we use Dow Corning Sylgard 184 PDMS. The two-part liquid components were mixed per manufacturer's instructions and poured into a plastic petri dish. The dish was place under vacuum for two hours to remove any air bubbles and then cured at 100° C. for two hours to cure the material. A rubber mallet and punch were used to cut holes in the PDMS or the PDMS was cut with a razor blade to create masks.

Stainless steel masks were ordered from stencil.com with square sizes of 250, 500, and 800 μm. A magnetic plate was placed on top of a hotplate prior to spray coating and the substrate for coating set between the metal plate and mask. The mask was held in place with rare earth magnets to ensure close contact between the mask and substrate when spray coating.

The Northwestern University logo was etched from a sheet of aluminum and used in a similar manner to the stainless-steel masks.

Quartz Crystal Microbalance (QCM) COF Sensing. Volatile analyte sensing was performed in one of two dosing chambers. In all cases, acoustic sensing was done using a QCM200 produced by Stanford Research Systems. All sensing experiments were done using Ti coated 1-inch quartz crystals with a native 5 MHz resonant frequency.

For high concentration dosing: QCM wafers with deposited COF active material were first inserted into the QCM paddle. This QCM paddle was then loaded into a two-neck glass flask equipped with a Teflon stir bar. The vessel was then purged with dry $N_2$ for several minutes to yield purify the sensing atmosphere. The vessel was then sealed and the QCM resonant frequency was allowed to equilibrate over five minutes. Then, 1 μL of liquid analyte was taken into a 2 μL syringe and injected directly onto the Teflon stir bar, which was spinning to homogenize the sensing environment. The injection time was then noted as time zero. The vessel was then closed for 20 minute while monitoring of the QCM resonant frequency once every ten seconds. Finally, the chamber was opened and flushed with dry $N_2$ until the QCM returned to its initial frequency.

For low concentration dosing: QCM wafers with deposited COF active material were first inserted into the QCM paddle. This paddle was then loaded into a metal sensing chamber. Dry $N_2$ was used to flush the sensing system at a rate of 500 $cm^3 \cdot min^{-1}$ for 30 min. After this flushing was finished, the desired analyte was introduced into the sensing environment at the concentration noted. The injection time was then noted as time zero. the sensing behavior was then monitored for 30 minute while monitoring of the QCM resonant frequency once every ten seconds. Finally, the sensing environment was flushed for one hour.

Synthetic Procedures

Scheme 1. Synthesis of 2,1,3-Benzothiadiazole-4,7-diboronic acid.

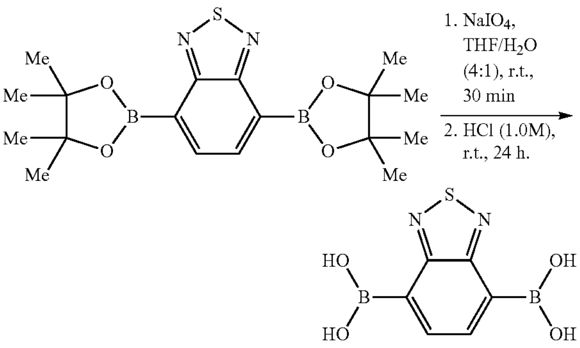

Synthesis of 2,1,3-Benzothiadiazole-4,7-diboronic acid. 2,1,3-Benzothiadiazole-4,7-diboronic acid was synthesized via slight modifications of literature procedures. All spectroscopic data is consistent with what has previously been reported.[4]

A mixture of 2,1,3-benzothiadiazole-4,7-bis(pinacolato) diboronic ester (5.0 g, 12.9 mmol) and sodium periodate (16.5 g, 77.3 mmol) in THF (165 mL) and water (41 mL) was stirred under $N_2$ at r.t. for 30 minutes. Hydrochloric acid (1.0 M, 21 mL) was slowly added to the stirring mixture over the course of 15 minutes. After complete addition, the resulting solution was stirred for 24 h. under a constant stream of $N_2$. After 24 h., the THF was removed in vacuo and the resulting precipitate was isolated by filtration. The precipitate was washed with water, hexanes, and diethyl ether to afford 2,1,3-Benzothiadiazole-4,7-diboronic acid as a light yellow, crystalline solid.

Scheme 2. Synthesis of pyrene-2,7-bis(boronic acid).

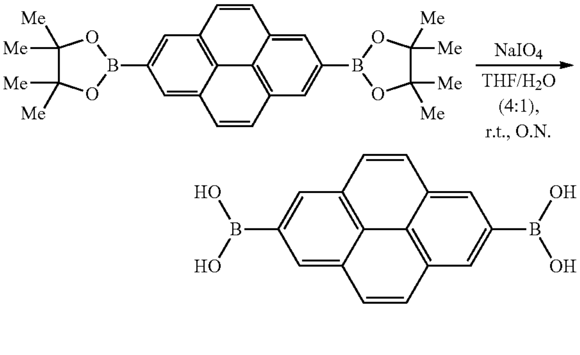

Synthesis of pyrene-2,7-bis(boronic acid): Pyrene-2,7-bis (boronic acid) was prepared via slight modifications of literature procedures. All spectroscopic data is consistent with what has previously been reported.[5]

Pyrene-2,7-diboronic ester (1.0 g, 2.21 mmol) was dissolved in THF (48 mL) and water (12 mL). To the stirring solution was added sodium periodate (2.84 g, 13.25 mmol) and the resulting solution was stirred under $N_2$ at room temperature overnight. The reaction was then filtered and washed with water (350 mL) taking special care not to allow the solid to dry on the filter paper. The solid residue was then rinsed with hexanes and diethyl ether and dried under vacuum.

Scheme 3. Synthesis of 4,4′-diphenylbutadiynebis(boronic acid).

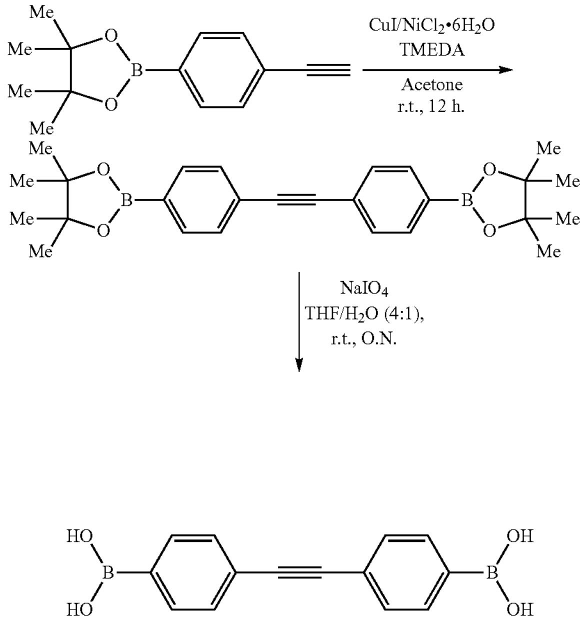

Synthesis of 4,4'-diphenylbutadiynebis(boronic acid): 4,4'-diphenylbutadiynebis(boronic acid) was prepared via slight modifications of literature procedures. All spectroscopic data is consistent with what has previously been reported.[6]

TMEDA (0.459 g, 3.946 mmol), CuI (0.188 g, 0.986 mmol), and $NiCl_2 \cdot 6H_2O$ (0.234 g, 0.986 mmol) were suspended in acetone (13 mL) under an atmosphere of air. The mixture became dark green after 10 min. 4-ethynylbenzeneboronic acid pinacol ester (4.50 g, 19.7 mmol) was then added and the resulting solution was stirred for 12 h. Upon completion of the reaction, the solvent was removed in vacuo and the resulting residue was washed with water (50 mL) and recrystallized from MeCN to provide the intermediate structure as a white solid.

The intermediate diboronate ester (400 mg, 0.88 mmol) and $NaIO_4$ (400 mg, 2.0 mmol) were dissolved in THF (4.5 mL) and water (1.5 mL) and stirred at room temperature, under a $N_2$ atmosphere overnight. After the reaction was complete, the reaction was diluted with water (20 mL) and the resulting precipitates were recovered via filtration. The recovered solid was washed with additional water (20 mL) and hexanes (10 mL) to yield 4,4'-diphenylbutadiynebis (boronic acid) as a white solid.

Scheme 4. General synthesis of colloidal COFs.

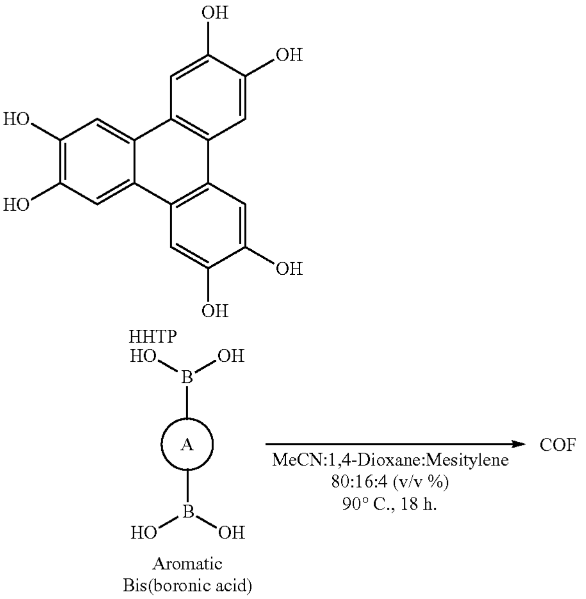

Synthesis of colloidal COFs: All COFs were prepared via a reported procedure. [Evans, A. M.; et al., Seeded Growth of Single-Crystal Two-Dimensional Covalent Organic Frameworks. *Science* 2018, 361, 52-57.] 2,3,6,7,10,11-Hexahydroxytriphenylene (HHTP, 2 mmol) and the appropriate corresponding boronic acid with a aromatic group A (BA, 3 mmol) were dissolved in a mixture of MeCN:1,4-dioxane:mesitylene (80:16:4 by volume; 20 mL) and sonicated for 10 min. The solution was passed through a 0.45-micron PTFE syringe filter to remove insoluble particulates. This solution was put into a 20 mL scintillation vial and sealed. This reaction mixture was heated without stirring to 80° C. overnight, which resulted in an indefinitely stable, translucent colloidal suspension.

Comparative Example: COF Thin Film Preparation

To optimize the spray coating of colloidal suspension of COFs, several interrelated parameters need to be optimized including the size of droplets that exit the spray coater, time of flight of droplets from the nozzle to the substrate, and rates of solvent evaporation in air and on the substrate.

After inks are deposited on the substrate, the drying conditions dictate the morphology of the resulting films. Large drops of ink that evaporate quickly can result in all of the material drying at the edges of the drop. If material is already deposited, new drops can also push that material to the edges of the drop, resulting in an inhomogeneous fractal-like pattern that can be observed under optical microscopy. By increasing the atomization rate of the ink when spray coating, smaller drops can be generated to allow for more favorable drying conditions. The number of drops, along with the time of flight between the nozzle and substrate, also affects the drying conditions. By increasing the atomization rate and optimizing the mixture of pressurized air to ink, it is possible to deposit a layer of drops that dry as they make contact with the substrate. This condition allows for continuous spraying of material onto the substrate that gives higher film homogeneity and eliminates the need to repeatedly trigger the spray coater to deposit more material. This procedure more than halves the amount of time required to deposit COFs on the substrate. The resulting films are also more closely compacted than the original films as observed through scanning electron microscopy (FIG. 4).

Figure 4:
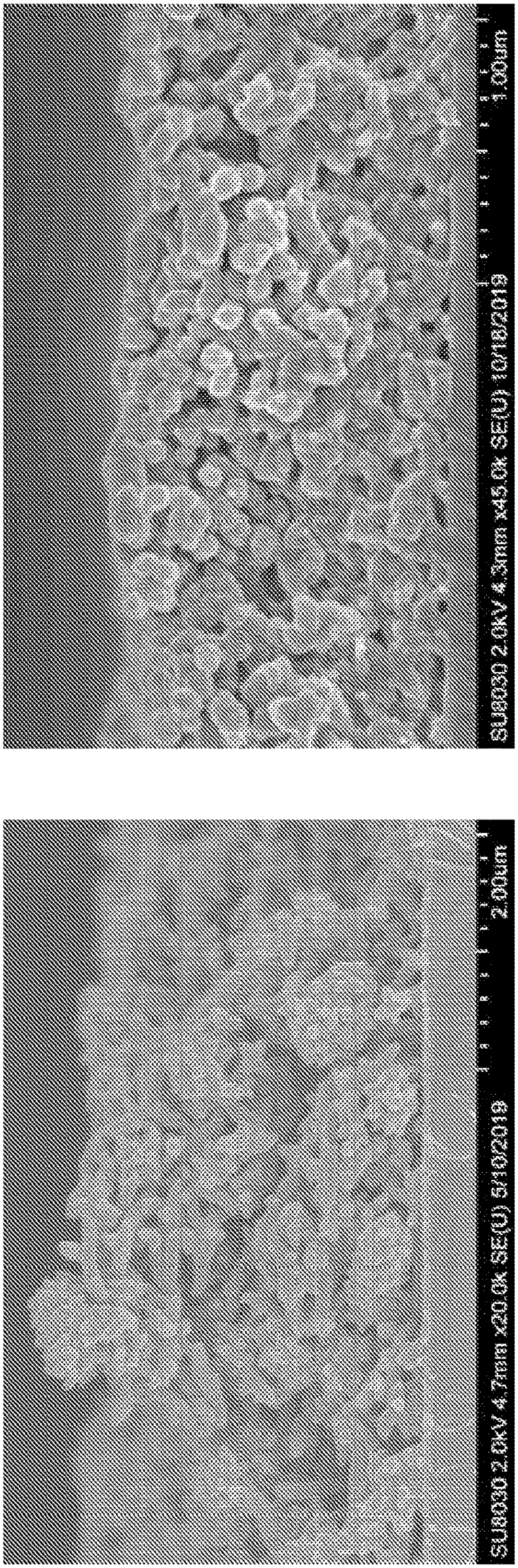
FIG. 4. The microporosity of deposited COF films depends sensitively on the spray coating conditions and can be varied from highly porous and inhomogeneous (left) to dense and homogeneous (right). The ability to tune microporosity is critical for many COF applications such as gas sensors where microporosity provides efficient pathways for target analytes to reach the entire thickness of the COF film.

The COF films were prepared under the following conditions:

Porous Sample Spray Coating Conditions (FIG. 4 (Left))
- Iwata airbrush model CP-HP
- 50% ink to pressurized air mixing ratio
- Ink droplets from 40 to 60 μm deposited on substrate
- Pulsed deposition (1:1 spray and wait)
- 20 psig air pressure
- 8 cm nozzle to substrate
- 100 C hot plate
- Substrate $SiO_2$ coated with Titanium Dense Sample Spray Coating Conditions (FIG. 4 (Right))
- Iwata airbrush model CP-HP
- 33% ink to pressurized air mixing ratio
- Ink droplets <5 μm deposited on substrate
- Constant spray
- 20 psig air pressure
- 3.65 cm Nozzle to substrate distance
- 100 C hot plate
- Substrate $SiO_2$ coated with Titanium The higher the ink to pressurized air ratio, the more ink is deposited on the surface at one point. This can cause slower evaporation because of large amounts of solvent present at one time on the surface. Lower ink to air ratios also allows for more air to pass over the surface of drops as they leave the nozzle. This causes evaporation on the surface of the drops that makes the drops smaller when deposited on the substrate. Large ink droplets dry slower, cause ink to dry only at the edges, and can push previously deposited material to the edges of the drop. By lowering the ink to air ratio and decreasing the droplet size, we create conditions that allow for nearly instantaneous drying as the ink is deposited even when the nozzle is more than 50% closer. The instantaneous drying also allows for continuous spray deposition and moving the nozzle closer. This helps concentrate the ink in a smaller region and prevent overspray onto the stencil.

The fractal-like deposition pattern can also be alleviated by adding higher boiling point solvents to the ink formulation to slow the evaporation rate, which allows particles to more evenly disperse on the substrate during drying. While this approach does improve the film morphology, it is not as effective as adjusting droplet size and optimizing the spray coating conditions for smaller droplets. Also, slower evaporation makes it more difficult to pattern the ink because any solvent that does not quickly evaporate can seep under the stencil mask. In addition, when patterning the ink while spray coating, the stencil needs to make intimate contact with the surface of the substrate to ensure that none of the liquid is pushed underneath the stencil from the force of ink hitting the surface of the substrate. This intimate contact can be accomplished by utilizing a conformal stencil material like PDMS that has a strong intermolecular force with the substrate. Alternative, metal stencils can be used by exerting approximately 10 N of downward force between the mask and the substrate.

We claim:

1. A method for preparing a covalent organic framework (COF) thin film, the method comprising expelling a plurality of COF colloidal ink drops having an effective deposition diameter from a nozzle onto the substrate, wherein expelling the plurality of COF colloidal ink drops comprises expelling a first plurality of COF colloidal ink drops and a second plurality of COF ink drops, the first plurality of COF colloidal ink drops comprising a first COF and the second plurality of COF colloidal ink drops comprising a second COF different than the first COF, and wherein the first plurality of COF colloidal ink drops are deposited on the substrate, thereby forming a thin film of the first COF, and the second plurality of COF colloidal ink drops are deposited on the thin film of the first COF or the first plurality of COF colloidal ink drops are deposited on a first substrate region and the second plurality of COF colloidal ink drops are deposited on a second substrate region different than the first substrate region.

2. The method of claim 1 further comprising heating the substrate to an effective COF deposition temperature or further comprising masking the substrate, wherein the plurality of COF colloidal ink drops are deposited on an unmasked region of the substrate.

3. The method of claim 1, wherein the method comprises heating the substrate to the effective COF deposition temperature and masking the substrate.

4. The method of claim 1, wherein the COF colloidal ink comprises crystalline COF nanoparticles having a diameter of 10-1000 nm, or wherein the effective deposition diameter of the plurality of COF colloidal ink drops have a maximum diameter of less than 20 μm.

5. The method of claim 1, wherein the COF colloidal ink comprises crystalline COF nanoparticles having a diameter of 10-1000 nm and wherein the effective deposition diameter of the plurality of COF colloidal ink drops have a maximum diameter of less than 20 μm.

6. The method of claim 1, wherein the plurality of COF colloidal ink drops are expelled by a pneumatic system, wherein the pneumatic system comprises a COF colloidal ink flow regulator, a pressurizing gas flow regulator, and a pneumatic control system, wherein the pneumatic control system is configured to regulate the COF colloidal ink flow regulator and/or the pressurizing gas flow regulator to modulate the effective deposition diameter.

7. The method of claim 1, wherein the first plurality of COF colloidal ink drops are deposited on the substrate, thereby forming a thin film of the first COF, and the second plurality of COF colloidal ink drops are deposited on the thin film of the first COF.

8. The method of claim 1, wherein the first plurality of COF colloidal ink drops are deposited on a first substrate region and the second plurality of COF colloidal ink drops are deposited on a second substrate region different than the first substrate region.

9. A method for preparing a covalent organic framework (COF) thin film, the method comprising expelling a plurality of COF colloidal ink drops having an effective deposition diameter from a nozzle onto the substrate, wherein the plurality of COF colloidal ink drops dry as they make contact with the substrate and wherein the plurality of COF colloidal ink drops are expelled by a pneumatic system, wherein the pneumatic system comprises a COF colloidal ink flow regulator, a pressurizing gas flow regulator, and a pneumatic control system, wherein the pneumatic control system is configured to regulate the COF colloidal ink flow regulator and/or the pressurizing gas flow regulator to modulate the effective deposition diameter.

10. The method of claim 9 further comprising heating the substrate to an effective COF deposition temperature or further comprising masking the substrate, wherein the plurality of COF colloidal ink drops are deposited on an unmasked region of the substrate.

11. The method of claim 10, wherein the method comprises heating the substrate to the effective COF deposition temperature and masking the substrate.

12. The method of claim 9, wherein the COF colloidal ink comprises two or more different COFs, wherein the COF colloidal ink comprises crystalline COF nanoparticles having a diameter of 10-1000 nm, or wherein the effective deposition diameter of the plurality of COF colloidal ink drops have a maximum diameter of less than 20 μm.

13. The method of claim 12, wherein the COF colloidal ink comprises two or more different COFs, wherein the COF colloidal ink comprises crystalline COF nanoparticles having a diameter of 10-1000 nm, and wherein the effective deposition diameter of the plurality of COF colloidal ink drops have a maximum diameter of less than 20 μm.

14. The method of claim 9, wherein expelling the plurality of COF colloidal ink drops comprises expelling a first plurality of COF colloidal ink drops and a second plurality of COF ink drops, the first plurality of COF colloidal ink drops comprising a first COF and the second plurality of COF colloidal ink drops comprising a second COF different than the first COF.

15. The method of claim 14, wherein the first plurality of COF colloidal ink drops are deposited on the substrate, thereby forming a thin film of the first COF, and the second plurality of COF colloidal ink drops are deposited on the thin film of the first COF.

16. The method of claim 14, wherein the first plurality of COF colloidal ink drops are deposited on a first substrate region and the second plurality of COF colloidal ink drops are deposited on a second substrate region different than the first substrate region.

* * * * *